United States Patent Office 3,501,440
Patented Mar. 17, 1970

3,501,440
**PROCESS FOR PREPARING VINYL CHLORIDE/
ETHYLENE COPOLYMERS**
Kosaku Kamio, Tatsuro Tadasa, and Tomio Hakozaki,
Toyama-ken, Japan, assignors to Nippon Carbide
Kogyo Kabushiki Kaisha, Tokyo, Japan
No Drawing. Continuation-in-part of application Ser. No.
610,738, Jan. 23, 1967. This application Apr. 16, 1968,
Ser. No. 721,625
Int. Cl. C08f 15/02, 15/40
U.S. Cl. 260—77.5          11 Claims

ABSTRACT OF THE DISCLOSURE

A copolymer of vinyl chloride and ethylene is prepared by copolymerizing ethylene with vinyl chloride or monomers consisting of at least 80% by weight of vinyl chloride and at most 20% by weight of other copolymerizable compounds in the presence of a free radical catalyst, at a reaction temperature between the critical temperature of ethylene (i.e. 9.9° C.) and 60° C., and at an ethylene pressure between 5 kg./cm.$^2$ and 150 kg./cm.$^2$ which pressure is maintained substantially constant by withdrawing excess ethylene out of the reaction vessel during the polymerization. The copolymer has improved properties, in particular, a more homogeneous composition, a high degree of polymerization, excellent transparency and workability, even when the ethylene content is high (e.g. more than 35 wt. percent), and the copolymer can be obtained easily and conveniently even on a large scale.

CROSS REFERENCE TO RELATED APPLICATION

This application is a continuation-in-part of our copending application Ser. No. 610,738 filed Jan. 23, 1967, now abandoned.

This invention relates to a process for preparing a copolymer of vinyl chloride and ethylene.

More particularly, it relates to an improvement in a process which comprises copolymerizing monomeric ethylene with vinyl chloride monomers in the presence of a free radical catalyst.

As used in this application, the term "vinyl chloride monomers" means vinyl chloride or a monomer mixture which consists of at least 80% by weight of monomeric vinyl chloride and at most 20% by weight of other compounds copolymerizable with ethylene and vinyl chloride.

Among various vinyl chloride copolymers, a copolymer containing combined vinyl chloride and ethylene (herein referred to as "vinyl chloride/ethylene copolymer") is superior in impact-resistance and flexibility.

Previously, several processes for preparing a vinyl chloride/ethylene copolymer have been disclosed in the literature and patents. However, none of the prior processes have yet worked successfully on an industrially large scale. This is due to the facts that the prior processes cannot be carried out easily and conveniently on a large scale, and that the copolymers obtained do not possess the desired properties.

More particularly, it was considered in general that the copolymerization of vinyl chloride and ethylene had to be carried out at a high reaction temperature and under a high pressure of ethylene because the reactivity of ethylene is much lower than that of vinyl chloride or other vinyl type monomers. Thus, the prior processes require a high reaction temperature and a high ethylene pressure (e.g. 90° C. and 1,000 atm.). However, the processes adopting such a high reaction temperature and such a high ethylene pressure necessarily require expensive apparatus and high operation costs, when worked on an industrially large scale.

Moreover, in order to enhance the ethylene content in the copolymer when desired, it is necessary to increase the ethylene pressure in the reactor. Such increase of the ethylene pressure reduces the rate of polymerization and causes a decrease in the degree of polymerization. In addition, as the ethylene content in the copolymer becomes higher, the homogeneity of the copolymer composition is reduced and consequently the transparency of the copolymer is reduced.

Recently, there was proposed a process for preparing a vinyl chloride/ethylene copolymer by using a modified Ziegler catalyst. However, this process has many disadvantages including the necessity of steps such as preparation of the catalyst, purification of solvent and monomer, and removal of catalyst residue remaining in the produced copolymer.

It is an object of the present invention to provide an improved process for preparing a vinyl chloride/ethylene copolymer, which is easily and conveniently carried out on an industrially large scale.

It is another object of the present invention to obtain a vinyl chloride/ethylene copolymer having improved properties, in particular, a high degree of polymerization and an excellent homogeneity of copolymer composition which results in a very good transparency of the copolymer, even when the ethylene content in the copolymer is high.

The present invention provides a process for preparing a copolymer containing combined vinyl chloride and ethylene which comprises copolymerizing monomeric ethylene with vinyl chloride monomers that consist of at least 80% by weight of monomeric vinyl chloride and at most 20% by weight of other compounds copolymerizable with ethylene and vinyl chloride, in the presence of a free radical catalyst, wherein the improvement comprises keeping the reaction temperature at a substantially constant temperature between the critical temperature of ethylene (i.e. 9.9° C.) and 60° C. and keeping the ethylene pressure in the reactor at a substantially constant pressure between 5 kg./cm.$^2$ and 150 kg./cm.$^2$. This can be accomplished by withdrawing ethylene from the reactor whenever necessary, the ethylene pressure otherwise rising gradually as the reaction proceeds if ethylene is not withdrawn.

The most important feature of the present invention is to withdraw or discharge ethylene from the reactor when necessary in a continuous or discontinuous manner so as to maintain a substantially constant ethylene pressure within the above specified range of pressure during the polymerization. If the ethylene is not withdrawn, the ethylene pressure in the reactor rises gradually as the copolymerization reaction proceeds. This results in a heterogeneous copolymer composition with a low degree of polymerization.

More particularly, we have found that a vinyl chloride/ethylene copolymer having a high content of ethylene and a high degree of polymerization can be obtained by copolymerizing vinyl chloride with ethylene under such mild conditions of reaction temperature and ethylene pressure as are specified above. However, the ethylene pressure in the reactor rises remarkably as the reaction proceeds, in spite of the fact that the quantities of the unreacted monomers (monomeric vinyl chloride and ethylene) decrease. If the ethylene pressure is not controlled, the copolymer produced is very heterogeneous in composition and has poor transparency.

As the result of our investigation, we have found that a copolymer of vinyl chloride and ethylene, which has good homogeneity and excellent transparency as well as a high degree of polymerization, can be prepared easily by controlling the ethylene pressure by means of withdrawing excess ethylene from the reactor.

The mechanism of the present discovery is not yet exactly known but it is believed to result according to the following. Under the conditions stated herein, monomeric vinyl chloride always exists in a liquid state. On the other hand, monomeric ethylene is not liquid because the reaction temperature is higher than its critical temperature, that is, 9.9° C. and it remains in the gaseous state. The major part of the gaseous ethylene dissolves in the liquid vinyl chloride monomers. The minor part of the gaseous ethylene remains in the atmosphere. Thus, the dissolved gaseous ethylene and the liquid vinyl chloride monomers are in liquid-gas equilibrium.

As the polymerization proceeds, vinyl chloride which is more reactive, is consumed more rapidly than ethylene. Therefore, the concentration of ethylene in the liquid vinyl chloride monomers increases. This results in breaking the equilibrium balance whereupon a portion of the dissolved ethylene passes into the atmosphere in the reactor which raises the ethylene pressure in the reactor and establishes a new equilibrium.

If the ethylene pressure is not controlled, the concentration of dissolved ethylene in the liquid vinyl chloride monomers changes as the reaction proceeds and consequently the composition of copolymer produced changes as the reaction proceeds.

On the other hand, if the ethylene pressure is controlled by withdrawing ethylene out of the reactor according to the present invention, the concentration of ethylene dissolved in the liquid vinyl chloride monomers can be maintained constant, and a copolymer of constant composition can be obtained. Thus, we have succeeded in establishing a process for preparing a homogeneous and transparent copolymer of vinyl cholride and ethylene by utilizing the change of ethylene pressure during the polymerization, which was considered unfavorable before our invention.

Several processes for preparing copolymers from two kinds of monomers which are different in reactivity from each other have been proposed in patents. In these processes, the monomer having higher reactivity is added stepwise or continuously to the reaction system during the polymerization in emulsion or suspension for the purpose of maintaining the molar ratio of the two monomers constant. Such processes attain the purpose in some cases. However, in the case of the copolymerization of viny chloride and ethylene, the process includes the step of dissolving ethylene into the liquid vinyl chloride monomers, and it takes a considerable time until equilibrium is attained. Especially in the case of emulsion and suspension polymerization is this factor significant. When vinyl chloride is added in the course of polymerization, the step of dissolving ethylene into the fresh liquid vinyl chloride also takes a long time. Therefore, in such as case, a heterogeneous copolymer with a low ethylene content is produced until the equilibrium is attained again. As a result, the homogeneity of the copolymer obtained is reduced and at the same time the average content of ethylene decreases as compared with the copolymers obtained without stepwise or continuous addition of liquid vinyl chloride. This phenomenon is particularly noticeable when vinyl chloride is added stepwise.

On the other hand, if the ethylene pressure is controlled by withdrawing some of the ethylene according to the present invention, a copolymer having homogeneous composition and a high average content of ethylene can be easily obtained. The ethylene pressure should be controlled within the range of the given pressure value ±20% (preferably ±10%). For instance, when the given pressure value is 30 kg./cm.$^2$, the ethylene pressure should be controlled within the range from 24 kg./cm.$^2$ to 36 kg./cm.$^2$ (preferably from 27 kg./cm.$^2$ to 33 kg./cm.$^2$). This operation can be easily performed by an automatic pressure controlling device, although it can be performed by hand.

In the present invention, ethylene is copolymerized with monomeric vinyl chloride or mixed monomers consisting of at least 80% by weight of monomeric vinyl chloride and at most 20% by weight of other compatible monomers copolymerizable with ethylene and vinyl chloride.

The other monomers which may be employed include for example, alpha-olefins other than ethylene and halogen-substituted compounds, thereof, diolefins, vinyl compounds other than vinyl chloride, vinylidene compounds, allyl compounds, unsaturated carboxylic acids and derivatives thereof, etc.

More specifically, other monomers copolymerizable with ethylene and with vinyl chloride include alpha-olefins such as propylene, butene and pentene; halogen-substituted olefins such as vinylidene chloride, 1,2-dichloroethylene and tetrafluoroethylene; vinyl esters such as vinyl acetate, vinyl propionate, vinyl benzoate and vinyl stearate; vinyl ethers such as methyl vinyl ether, and octyl vinyl ether; acrylic acid and its esters, e.g. methyl acrylate, butyl acrylate, and 2-ethyl hexyl acrylate; methacrylic acid and its esters, e.g. methyl methacrylate and ethyl methacrylate; dienes such as butadiene, isoprene; aromatic vinyl compounds such as styrene and alpha-methyl styrene; unsaturated nitriles such as acrylonitrile and methacrylonitrile; maleic acid and its esters, e.g. maleic acid monoethyl ester, and maleic acid diethyl ester; fumaric acid and its esters, e.g. fumaric acid diethyl ester; itaconic acid, itaconic esters; allyl compounds such as allyl alcohol, methallyl alcohol, allyl chloride, allyl acetate and allyl glycidyl ether; vinylene carbonate; indene; vinyl carbazol; vinyl sulfonate; and vinylpyrrolidone.

In the present invention, non-copolymerizable organic solvents may be added to the reaction system in an amount of less than 20% by weight on the basis of the vinyl chloride used. An amount of more than 20% by weight of non-copolymerizable organic solvents is not preferred because of the problem of recovering the solvents. As non-copolymerizable solvents, inert organic solvents and chain transfer agents can be used. The inert organic solvents include aromatic and aliphatic compounds such as benzene, toluene, hexane and cyclohexane and their derivatives containing halogen or oxygen. The chain transfer agents include chloroform, bromoform, trichloroethylene, mercaptans and other compounds which are known as chain transfer agents in general.

Also in order to increase the degree of polymerization, cross-linking agents such as divinyl benzene, diallyl phthalate and ethylene glycol dimethacrylate may be added to the reaction system in an amount of less than 20% by weight (preferably less than 10% by weight) on the basis of the vinyl chloride used.

A monomeric mixture of vinyl chloride and ethylene is preferably polymerized in an aqueous medium wherein vinyl chloride is emulsified or suspended because the heat of polymerization can be easily removed and agitation can be easily effected. As the aqueous medium, water can be used conveniently. A mixture of water and a water soluble alochol such as methanol, ethanol, isopropanol, tertiary butanol, or mixtures thereof can be preferably used at lower polymerization temperatures.

Emulsifiers, suspension agents or mixtures of emulsifier and salt can be used in order to have a stable emulsion or suspension. An example of a preferred emulsifier is sodium dodecylbenzenesulfonate. Combination of emulsifier and salt are preferably used in the emulsion polymerization in order to obtain copolymer granules with a high bulk density. The polymerization reaction system is agitated during the reaction.

In the present invention, free radical catalysts are used as the initiator, potassium persulfate (KPS) or ammonium persulfate (APS) can be used alone, but redox catalytic systems such as KPS—sodium sulfite (SS), KPS—sodium formaldehyde sulfoxylate (Ronglit) (RGL), APS—ascorbic acid (ASA) are most preferable because the polymerization temperautre is low. Furthermore, heavy metal salts such as $Fe^{+++}$, $Cu^+$ can be added to these redox catalytic systems. Water-soluble redox catalysts are preferable, but oil-soluble catalysts may be used. As oil-soluble catalysts, organic peroxides such as lauroyl peroxide (LPO) and dissopropylperoxy dicarbonate (IPP); azobisnitriles such as azobisisobutyronitrile; and oil-soluble redox catalytic systems can also be used.

Stepwise or continuous addition of a catalyst during the polymerization is desirable because of high conversion yield and a high degree of polymerization can be easily obtained. According to the present invention, copolymers having such a high ethylene content as more than 35% by weight can be easily obtained under the conditions of reaction temperature of 9.9–60° C. and ethylene pressure of 5–150 kg./cm.$^2$.

At temperatures above 60° C., a high ethylene pressure is required in order to enhance the ethylene concentration in the liquid vinyl chloride monomers, which results in expensive equipment. In this case, copolymerization under a lower pressure gives only copolymers having a low ethylene content. Moreover it should be noted that a high reaction temperature reduces the degree of polymerization of the copolymers obtained.

It a reaction temperature below 9.9° C., is used, ethylene is liquefied, and it is very difficult to control the ratio of monomers in the reaction system. Accordingly, homogeneous copolymers cannot be prepared. This problem is especially acute in copolymers rich in ethylene.

Copolymers prepared under an ethylene pressure below 5 kg./cm.$^2$ contain little ethylene, and practically are not different from polyvinyl chloride in their properties.

At pressure up to 150 kg./cm.$^2$, copolymers rich in ethylene can be obtained which show high resistance to impact. Above 150 kg./cm.$^2$ the operation becomes very difficult, and the properties of the copolymers are not significantly improved. Particularly, the glass transition temperature of the copolymers linearly decreases as the content of ethylene increases and it reaches —25° C. when the copolymers contain 40% by weight of ethylene. Beyond this point, the glass transition temperature is scarcely lowered even if the ethylene content in the copolymers is increased. Copolymers prepared with an ethylene pressure under 150 kg./cm.$^2$ contain already more than 40% by weight of ethylene and have good flexibility. Therefore, it is not favorable to conduct the polymerization employing an ethylene pressure above 150 kg./cm.$^2$.

According to the present invention, changes of the reaction temperature and the ethylene pressure should be avoided, because they cause the heterogeneity and opaqueness in the copolymers.

The polymerization should be terminated when most of the vinyl chloride monomers is consumed and a decrease in the partial pressure of vinyl chloride is observed.

Copolymers of vinyl chloride and ethylene prepared according to the present invention have excellent transparency comparable with that of polyvinyl chloride, even when the content of ethylene is high. The copolymers have properties similar to those of the conventional semirigid or plasticized polyvinyl chloride, depending on the content of ethylene, and show high resistance to impact. The resins prepared by the process of the present invention are very homogeneous and have excellent workability.

Example 1

A one liter autoclave made of stainless steel was charged with 130 ml. of methanol and 260 ml. of distilled water. To the mixture were added 0.5 g. of sodium dodecylbenzenesulfonate and 0.1827 g. of ammonium persulfate, and then the solution was cooled to —20° C.

To this solution were added 0.0616 g. of sodium formaldehyde sulfoxylate, 0.0016 g. of Mohr's salt, ferrous ammonium sulfate. After flushing the vessel with oxygen-free nitrogen, 10 g. of monomeric vinyl chloride were added and ethylene was added under pressure. The reaction system was maintained at 10° C. for 5 hours during which the ethylene pressure was maintained at 10 kg./cm.$^2$ with allowance of ±0.5 kg./cm.$^2$ by withdrawing continuously any excess ethylene by use of an automatic pressure controlling valve.

Eighty-nine grams of copolymer were obtained, which had an intrinsic viscosity $[\eta]$ of 2.49 (in cyclohexanone, 30° C.) and containd 2.35 wt. percent of ethylene.

The copolymer had good workability and transparent sheets were obtained therefrom as follows:

One hundred parts by weighet of the copolymer were compounded with 3 parts of dibutyltin maleate and 0.7 part of lubricant (stearic acid), and the mixture was kneaded on rolls (4″ diameter x 10″) at 150° C. for 10 minutes. Four sheets (0.5 mm. thick) thus obtained were laminated to a sheet 2 mm. thick. The haze measured by ASTM 1003 was 4.7%.

Another 100 parts of the copolymer were mixed with 3 parts of a mixed stabilizer of metal soaps (a mixture of cadmium stearate and barium stearate) and 0.7 part of stearic acid as a lubricant. The mixture was tested for the melt-flow as follows.

The sample was heated up at a rate of 3° C. per minute from 100° C. and extruded from a nozzle of 1 mm. in diameter and 1 mm. in length at 70 kg./cm.$^2$ using a Koka's flow tester and the temperature was measured when the flowing rate was $2\times10^{-3}$ cm.$^3$/sec. (the temperature will be called "flow temperature" hereinafter). The flow temperature measured in this way was 194° C. and the sample could be easily worked without any discoloration. On the other hand, homo-polyvinyl chloride ($[\eta]=2.28$) had a flow temperature of 239° C. and was discolored.

Another laminated sheet, which was made in the same conditions except that the rolling temperature was 170° C. had a haze of 6.7%.

Example 2

In this example, the copolymerization was carried out under the same conditions as in Example 1 except that the ethylene pressure was maintained at 20 kg./cm.$^2$. 54.6 g. of copolymer were obtained, which had an intrinsic viscosity of 1.88 and contained 5.54 wt. percent of ethylene.

The flow temperature measured by the same method as in Example 1 was 169° C. and the haze was 6.3%.

The copolymer in this example had excellent workability and was as transparent as homo-polyvinyl chloride.

Example 3

The procedure of Example 1 was repeated except that the sodium formaldehyde sulfoxylate was replaced by 0.0705 g. of ascorbic acid and the ethylene pressure was maintained at 50 kg./cm.$^2$ 20.0 g. of copolymer were obtained, which had an intrinsic viscosity of 1.17 and contained 15.74 wt. percent of ethylene.

Films made from the copolymer had few fish-eyes and were very transparent and flexible. From this fact, it is apparent that the copolymer obtained by the process of the present invention has a homogeneous composition and a sharp distribution of degree of polymerization.

Example 4

A 700 ml. autoclave made of stainless steel was charged with 400 ml. of distilled water, 0.1 g. sodium dodecylbenzenesulfonate, 0.0913 g. ammonium persulfate and 0.0416 g. sodium bisulfite.

After flushing the vessel with oxygen-free nitrogen, 100 g. of monomeric vinyl chloride were fed and ethylene was introduced into the autoclave until the ethylene pressure reached 30 kg./cm.$^2$. Copolymerization was carried out at 20° C. for 7 hours, during which the ethylene pressure was maintained at 30 kg./cm.$^2$ by withdrawing ethylene as required. 39.0 g. of copolymer were obtained. The copolymer had an intrinsic viscosity of 1.44 and contained 7.3 wt. percent of ethylene.

Sheets made from the copolymer had excellent transparency. The flow temperature and haze were measured in the same way as in Example 1 and found to be 131° C. and 6.2% respectively.

Example 5

Four hundred and fifty ml. of distilled water, 0.3 g. of polyvinyl alcohol and 1.5 g. of 10% solution of diisopropyl peroxydicarbonate in toluene were placed in a 700 ml. autoclave made of stainless steel. After flushing the vessel with oxygen-free nitrogen, 150 g. of monomeric vinyl chloride were fed and ethylene was introduced into the vessel. The reaction temperature was maintained at 50° C. for 7 hours, during which the ethylene pressure was kept at 30 kg./cm.$^2$ by removing excess ethylene. 100 g. of white granules of copolymer were obtained. The copolymer was homogeneous and had an ethylene content of 6.5 wt. percent and an intrinsic viscosity of 0.84.

Sheets made from the copolymer had excellent transparency. The flow temperature was 148° C. and the haze was 3.6%. Binding time on roll and gelation time were measured and found to be 5 seconds and 20 seconds respectively. On the other hand, those of homo-polyvinyl chloride were 25 seconds and 60 seconds respectively.

From the above results, it is apparent that the copolymers prepared according to the present invention are superior in gelation property and workability on rolling.

Example 6

The procedure of Example 5 was repeated except that 0.3 g. of lauroyl peroxide was used in place of diisopropyl peroxydicarbonate. Copolymerization was conducted at 60° C. for 7 hours while the ethylene pressure was maintained at 10 kg./cm.$^2$. 96 g. of homogeneous copolymer were obtained, which contained 2.5 wt. percent of ethylene and had an intrinsic viscosity of 0.93. The flow temperature was 157° C. and the haze was 5.2%.

One hundred parts by weight of the copolymer, 3 parts of mixed stabilizer of metal soaps (a mixture of cadmium stearate and barium stearate), 30 parts of plasticizer and 0.7 part of lubricant (stearic acid) were compounded and rolled by means of "four rolls (6" diameter x 12") of inverse L-type" to form films of 0.07 mm. in thickness. The films had 8 fish eyes per 100 cm.$^2$.

For comparison, a similar sample was made from a copolymer which was obtained by maintaining the ethylene pressure at 10 kg./cm.$^2$ by means of stepwise addition of monomeric vinyl chloride into the reaction system. This sample had 450 fish eyes per 100 cm.$^2$.

From the above comparison, it is noted that the copolymer prepared according to the present invention has a very homogeneous composition and a sharp distribution of degrees of polymerization, while the copolymer prepared by a process adopting stepwise addition of monomeric vinyl chloride has a very heterogeneous composition and a wide distribution of degrees of polymerization.

Example 7

The procedure of Example 4 was repeated except that a 2-liter vessel made of stainless steel was employed and as initiators, 0.5481 g. of ammonium persulfate and 0.3024 g. of sodium sulfate were used, and copolymerization was carried out at 30° C. for 8 hours while keeping the ethylene pressure at 120 kg./cm.$^2$. The copolymer thus obtained contained 32.7 wt. percent of chemically combined ethylene.

The haze of sheets made from the copolymer was found to be 10.6%.

Reference Example 1

For comparison, the procedure of Example 4 was repeated except that 0.0913 g. of ammonium persulfate and 0.0416 g. of sodium sulfite were used and the ethylene pressure, which was 20 kg./cm.$^2$ when charged, was not controlled during the reaction. After copolymerization was conducted for 7 hours, the ethylene pressure increased to 35 kg./cm.$^2$ and 66.5 g. of copolymer were obtained.

The haze of the copolymer measured in the same way as in Example 1 was 15.2%, which was much worse than that in Example 4. This shows that copolymers obtained by a process in which the ethylene pressure is not controlled are very inferior in transparency compared with those obtained according to the present invention.

Reference Example 2

A 300 ml, stainless steel autoclave was charged with 0.02 g. of lauroyl peroxide, flushed with oxygen-free nitrogen and then charged with 100 g. of vinyl chloride. Copolymerization was carried out at 86° C. for two hours, during which the ethylene pressure rose gradually and reached 200 kg./cm.$^2$ at the highest. 20 g. of copolymer were obtained, which contained only 6.8 wt. percent of ethylene in spite of the fact that the ethylene pressure was so high. The haze of the copolymer was 17.4%, which means that the resin was very opaque.

Reference Examples 3–4

A procedure similar to Example 1 was repeated in a 2-liter autoclave at —10° C. for 8 hours, using as initiators 0.5481 g. of ammonium persulfate, 0.3696 g. of sodium formaldehyde sulfoxylate and 0.0096 g. of Mohr's salt, ferrous ammonium sulfate. Changing the length of time during which ethylene was maintained under a presure of 50 kg./cm.$^2$ before polymerization was started by adding the initiators, two polymerization experiments were carried out. The results are shown in the following Table 1. No increase in the ethylene pressure during polymerization was observed in either case.

TABLE 1

| Example No. | Time during which ethylene was under pressure before polymerization (hr.) | Yield (g.) | Ethylene content percent | Intrinsic viscosity |
|---|---|---|---|---|
| 3 | 2 | 40 | 21 | 1.30 |
| 4 | 6 | 12 | 28 | 1.22 |

As seen in Table 1, as the time is increased, the yield of copolymer decreased remarkably and at the same time the ethylene content of the copolymer increased.

The reason why the ethylene content of the copolymer increased as the time is increased is considered to be as follows. The vapor pressure of ethylene at —10° C. is 33.5 kg./cm.$^2$. Accordingly when a pressure higher than 33.5 kg./cm.$^2$ is applied at 10° C. ethylene is liquefied. And the longer the time during which the pressure is applied before polymerization, the larger the amount of liquefied ethylene becomes, resulting in an increase of the molar ratio of ethylene in the liquid monomers. This increase of the proportion of ethylene causes the increase of ethylene content in the copolymer.

The results shown in Table 1 show that the molar ratio of ethylene in the liquid monomers varies with the time during which ethylene is under pressure. This means that the composition of copolymer obtained by the above precess is uneven. Therefore, it is impossible to obtain a homogeneous copolymer under the above conditions including the reaction temperature below the critical point of ethylene (i.e. 9.9° C.).

Reference Examples 5–6

A 2-liter stainless steel autoclave was charged with 600 ml. of distilled water, 0.6 g. of polyvinyl alcohol and 0.15 g. of azobisisobutyronitrile. After flushing the vessel with oxygen-free nitrogen, 300 g. of monomeric vinyl chloride were charged and ethylene was introduced. The autoclave was kept at 80° C. for 7 hours. The results of two polymerization experiments are shown in Table 2.

TABLE 2

| Reference Example No. | Ethylene pressure (kg./cm.²) | Reaction temp. (° C.) | Ethylene content of copolymer percent | Ethylene of polymerization | Intrinsic viscosity |
| --- | --- | --- | --- | --- | --- |
| 5 | 30 | 80 | 1.4 | 410 | 0.49 |
| 6 | 80 | 80 | 6.7 | 235 | 0.33 |

Copolymers obtained in this way have a very low degree of polymerization and cannot be used as plastic materials because the properties are very inferior. Moreover, they have a much lower content of ethylene compared with that of copolymers obtained at lower temperature.

Reference Example 7

The procedure of Example 5 was repeated except that a 1.5-liter autoclave was used and the ethylene pressure was kept at 180 kg./cm.². The copolymer thus obtained was rubbery and contained 35 wt. percent of ethylene, but the yield was only 7 g. and the intrinsic viscosity only 0.38.

Reference Example 8

The procedure of Example 5 was repeated except that a 1.5-liter autoclave was used and additional 30 g. amounts of monomeric vinyl chloride were added 2, 4 and 6 hours after the start of polymerization so that the ethylene pressure was maintained at about 30 kg/cm.². The yield of copolymer was 150 g., which was more than the yield in Example 5, but the ethylene content and the intrinsic viscosity were only 4.2 wt. percent and 0.93 respectively.

Films made from the copolymer had 520 fish eyes per 100 cm.². This means that when the stepwise addition of monomeric vinyl chloride is adopted, copolymers having a low ethylene content and a high degree of polymerization are produced in a large amount.

Example 8

A two liter stainless steel autoclave was charged with 640 ml. of distilled water, 160 ml. of ethanol, 0.493 g. of sodium formaldehyde sulfoxylate, 0.109 g. of hydrogen peroxide and 4 g. of sorbitan monolaurate. The autoclave and its contents were cooled to 10° C. After flushing the vessel with oxygen-free nitrogen, 200 g. of vinyl chloride were added and then ethylene was added until the ethylene pressure was 35 kg./cm². The polymerization was carried out at 10° C. for hours, while the pressure of ethylene was maintained constant at 35 kg./cm.² by withdrawing excess ethylene. The yield of copolymer was 182 g. The ethylene content and intrinsic viscosity of the copolymer were 18.3 wt. percent and 1.31, respectively. Films made from the copolymer had no appreciable fish eyes and were very transparent and flexible. The haze was 4.3%.

Example 9

A two liter stainless steel autoclave was charged with 720 ml. of distilled water, 80 ml. of tertiary butyl alcohol, 16 ml. of 5% polyvinyl alcohol aqueous solution, 3.498 g. of tri-n-butyl boron and 1.730 g. of tertiary butyl hydroperoxide. The autoclave and its contents were cooled to 10° C. After flushing the vessel with oxygen-free nitrogen, 400 g. of vinyl chloride were added and then ethylene was added to elevate the pressure up to 20 kg./cm.². The polymerization was carried out at 10° C. for 10 hours, while the pressure of ethylene was maintained constant at 20±0.5 kg./cm.² by withdrawing excess ethylene. The yield of copolymer was 390 g. The ethylene content and intrinsic viscosity of the copolymer were 9.2 wt. percent and 1.55, respectively. The haze was 5.3%. Films made from the copolymer had as few as 10 fish eyes per 100 cm.².

Examples 10–18

These examples relate to emulsion inter-polymerization of vinyl chloride-ethylene-the third component systems. In each example, a two liter stainless steel autoclave was charged with 800 ml. of distilled water, vinyl chloride monomer, the third component monomer, polymerization initiator and emulsifier as shown in Table 3. After flushing the vessel with oxygen-free nitrogen, ethylene was added to the vessel under pressure and the polymerization was carried out for 10 hours at the temperatures and the ethylene pressures indicated in Table 3. During each polymerization, the ethylene pressure was maintained at the given pressure ±0.5 kg./cm.² by withdrawing excess ethylene.

The results obtained were shown in Table 4. The copolymers obtained were homogeneous and the sheets and films made from them were highly transparent. The films had no appreciable fish eyes. The copolymers obtained in Examples 10 and 11 were as soft as polyvinyl chloride plasticized with 50 parts of dioctyl phthalate and are, therefore, very useful as a transparent resin containing no plasticizer.

TABLE 3

| Example | Vinyl chloride (g.) | Third Component Monomer Kind | Amount | Ethylene pressure (kg./cm.²) | Emulsifier | Polymerization initiator | Polymerization temp. (° C.) |
| --- | --- | --- | --- | --- | --- | --- | --- |
| 10 | 160 | Vinyl acetate | 40 | 40 | Polyoxy ethylene lauryl ether 4 g. | APS-SS | 20 |
| 11 | 180 | ...do... | 20 | 20 | ...do... | APS-SS | 20 |
| 12 | 195 | Ethyl vinyl ether | 5 | 40 | Tri-methyl hexadecyl ammonium chloride 4 g. | H₂O₂-RGL | 20 |
| 13 | 160 | Propylene | 40 | 30 | A | H₂O₂-RGL | 20 |
| 14 | 194 | Methyl methacrylate | 6 | 20 | Sodium dodecylbenzene-sulfonate 4 g. | tBHPO-SS | 20 |
| 15 | 194 | Diethyl maleate | 6 | 30 | ...do... | tBHPO-SS | 20 |
| 16 | 198 | Vinyl pyrrolidone | 2 | 30 | ...do... | tBHPO-SS | 20 |
| 17 | 198 | Acrylic acid | 2 | 20 | ...do... | APS-SS | 20 |
| 18 | 198 | Styrene | 2 | 20 | Polyoxy ethylene lauryl ether 4 g. | APS-SS | 20 |

A—Polyoxy ethylene lauryl ether, 2 g. sodium dodecyl benzenesulfonate, 2 g. H₂O₂—Hydrogen peroxide, 0.020 g. RGL—Sodium formaldehyde sulfoxylate, 0.247 g. APS—ammonium persulfate, 0.365 g. SS—Sodium sulfite, 0.202 g. tBHPO—Tertiary-buytl hydroperoxide, 0.144 g.

TABLE 4

| Example | Yield (g.) | Intrinsic viscosity | Copolymer Composition (wt. (percent)) | | | Haze (percent) |
| --- | --- | --- | --- | --- | --- | --- |
| | | | Ethylene | Vinyl chloride | Third component monomer | |
| 10 | 86.4 | 1.23 | 14.1 | 79.0 | 6.9 | 3.5 |
| 11 | 137.4 | 1.27 | 5.7 | 86.2 | 8.1 | 4.8 |
| 12 | 141.4 | 0.76 | 15.4 | 83.2 | 1.4 | 4.3 |
| 13 | 117.0 | 0.85 | (¹) | 88.5 | (¹) | 4.1 |
| 14 | 60.4 | 1.12 | 5.0 | 85.6 | 9.4 | 5.1 |
| 15 | 135 | 1.10 | 8.8 | 86.6 | 3.4 | 4.8 |
| 16 | 170.3 | 1.20 | 8.8 | 87.4 | 3.8 | 4.4 |
| 17 | 96.8 | 1.47 | 4.9 | 92.6 | 2.5 | 5.4 |
| 18 | 51.0 | 1.22 | 5.1 | 90.1 | 4.8 | 3.1 |

¹ Ethylene+third component (propylene)=11.5

What is claimed is:

1. A process for preparing a copolymer containing combined vinyl chloride and ethylene in which vinyl chloride and ethylene are copolymerized batchwise in the presence of a free radical catalyst, the improvement which comprises dissolving a major portion of gaseous ethylene monomer in liquid vinyl chloride monomer, and carrying out the polymerization reaction by maintaining the reaction temperature at a substantially constant temperature between the critical temperature of ethylene, 9.9° C., and 60° C., maintaining the ethylene pressure in the reactor at a substantially constant pressure between 5 kg./cm.$^2$ and 150 kg./cm.$^2$ by withdrawing a portion of the gaseous ethylene from the reactor upon elevation of the ethylene pressure as the reaction proceeds, and terminating the polymerization reaction when the pressure in the reactor drops.

2. A process according to claim 1 wherein the monomers which are polymerized consists essentially of ethylene and vinyl chloride.

3. A process according to claim 1, wherein there is copolymerized with the vinyl chloride and ethylene at least one additional compatible unsaturated monomer present in an amount of at most 20% by weight based on the combined weight of the vinyl chloride monomer and the weight of the additional monomer.

4. A process according to claim 3, wherein the additional monomer is selected from the group consisting of propylene, butene, pentene, vinylidene chloride, 1,2-dichloroethylene, tetrafluoroethylene, vinyl acetate, vinyl propionate, vinyl benzoate, vinyl stearate, methyl vinyl ether, octyl vinyl ether, acrylic acid, methyl acrylate, butyl acrylate, 2-ethyl hexyl acrylate, methacrylic acid, methyl methacrylate, ethyl methacrylate, butadiene, isoprene, styrene, alpha-methyl styrene, acrylonitrile, methacrylonitrile, maleic acid, maleic acid monoethyl ester, maleic acid diethyl ester, fumaric acid, fumaric acid diethyl ester, itaconic acid, itaconic esters, allyl alcohol, methallyl alcohol, allyl chloride, allyl acetate, allyl glycidyl ether, vinylene carbonate, indene, vinyl carbazol, vinyl sulfonate, vinylpyrrolidone, and mixtures thereof.

5. The process according to claim 1 wherein water is used as a reaction medium.

6. The process according to claim 1, wherein the vinyl chloride is emulsified in water as a reaction medium.

7. The process according to claim 1, wherein the vinyl chloride is suspended in water as a reaction medium.

8. The process according to claim 1, wherein a mixture of water and a water-soluble alcohol is used as a reaction medium.

9. The process according to claim 1, wherein the free radical catalyst is a water-soluble redox polymerization catalyst.

10. The process according to claim 1, wherein the withdrawal of the ethylene is conducted in a continuous manner.

11. A process according to claim 1, wherein the ethylene pressure varies between plus and minus 10% of the desired pressure.

References Cited

UNITED STATES PATENTS

| | | | |
|---|---|---|---|
| 2,414,311 | 1/1947 | Larson | 260—94 |
| 2,485,796 | 10/1949 | White | 260—87.3 |
| 2,592,526 | 4/1952 | Seed | 260—29.6 |
| 3,403,137 | 9/1968 | Andersen et al. | 260—87.5 |

FOREIGN PATENTS 1,035,339  7/1966  England.

JOSEPH L. SCHOFER, Primary Examiner

S. M. LEVIN, Assistant Examiner

U.S. Cl. X.R.

260—78.5, 79.3, 80.6, 80.7, 80.8, 80.72, 80.75, 80.76, 80.77, 80.78, 80.81, 87.5